United States Patent
Wu et al.

(10) Patent No.: US 9,305,313 B2
(45) Date of Patent: Apr. 5, 2016

(54) SYSTEM AND METHOD FOR A GRAPHICAL USER INTERFACE HAVING A RESIZABLE RECOMMENDATIONS AREA

(71) Applicant: Rakuten Kobo Inc., Toronto (CA)

(72) Inventors: James Wu, Toronto (CA); Robin Bennett, Toronto (CA); Daniel Hill, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 145 days.

(21) Appl. No.: 14/016,670

(22) Filed: Sep. 3, 2013

(65) Prior Publication Data
US 2014/0074652 A1 Mar. 13, 2014

Related U.S. Application Data (60) Provisional application No. 61/697,077, filed on Sep. 5, 2012.

(51) Int. Cl.
| | |
|---|---|
| *G06F 3/048* | (2013.01) |
| *G06Q 30/06* | (2012.01) |
| *G06T 11/60* | (2006.01) |
| *G06F 17/21* | (2006.01) |
| *G06F 3/0481* | (2013.01) |
| *G06F 3/0485* | (2013.01) |
| *G06Q 10/10* | (2012.01) |
| *G06Q 50/00* | (2012.01) |

(52) U.S. Cl.
CPC .......... *G06Q 30/0631* (2013.01); *G06F 3/0485* (2013.01); *G06F 3/04812* (2013.01); *G06F 17/212* (2013.01); *G06Q 10/10* (2013.01); *G06Q 50/01* (2013.01); *G06T 11/60* (2013.01)

(58) Field of Classification Search
CPC . G06F 17/212; G06F 3/04812; G06F 3/0485; G06F 17/030867
See application file for complete search history.

(56) References Cited

U.S. PATENT DOCUMENTS

| | | | | |
|---|---|---|---|---|
| 2007/0180389 | A1* | 8/2007 | Holm et al. | 715/764 |
| 2008/0260253 | A1* | 10/2008 | Miyazaki | 382/190 |
| 2009/0193351 | A1* | 7/2009 | Lee et al. | 715/769 |
| 2010/0042932 | A1* | 2/2010 | Lehtiniemi et al. | 715/747 |
| 2010/0083165 | A1* | 4/2010 | Andrews et al. | 715/784 |
| 2010/0332980 | A1* | 12/2010 | Sun et al. | 715/706 |
| 2012/0078937 | A1* | 3/2012 | Hall | 707/767 |
| 2012/0078952 | A1* | 3/2012 | Araya | 707/769 |
| 2012/0078953 | A1* | 3/2012 | Araya | 707/769 |
| 2012/0084292 | A1* | 4/2012 | Liang et al. | 707/741 |
| 2014/0038703 | A1* | 2/2014 | Lampert et al. | 463/26 |

* cited by examiner

*Primary Examiner* — William Bashore
*Assistant Examiner* — Rayeez Chowdhury
(74) *Attorney, Agent, or Firm* — Oblon, McClelland, Maier & Neustadt, L.L.P (57) ABSTRACT

A system and method for rendering a graphical user interface having recommendations. The method includes accessing, within a mobile device, a data store corresponding to a multimedia container. The multimedia container comprises a first object and a second object and the multimedia container is operable to comprise one or more applications, widgets, pieces of content, and other multimedia containers. The data store comprises metadata associated with the first object and the second object. The method further includes displaying a plurality of images each corresponding to a respective recommendation based at least on the metadata associated with the first object and receiving an input. The plurality of items is displayed within a first portion of a display device. The method further includes in response to the input, displaying the plurality of images within a second portion of the display device. The second portion of the display device is greater in size than the first portion of the display device.

20 Claims, 9 Drawing Sheets

SYSTEM AND METHOD FOR A GRAPHICAL USER INTERFACE HAVING A RESIZABLE RECOMMENDATIONS AREA

CROSS REFERENCE TO RELATED APPLICATIONS

This application claims the benefit of and priority to the provisional patent application Ser. No. 61/697,077, entitled "SYSTEM AND METHOD OF PROVIDING A USER INTERFACE ON A MOBILE DEVICE," with filing date Sep. 5, 2012, and hereby incorporated by reference in its entirety.

This application claims the benefit of and priority to the copending non-provisional patent application Ser. No. 13/601,363, entitled "SYSTEM AND METHOD FOR A MULTIMEDIA CONTAINER," with filing date May 23, 2013, and hereby incorporated by reference in its entirety.

This application claims the benefit of and priority to the copending non-provisional patent application Ser. No. 13/601,426, entitled "SYSTEM AND METHOD FOR MANAGING OBJECTS IN A MULTIMEDIA CONTAINER," with filing date May 23, 2013, and hereby incorporated by reference in its entirety.

This application claims the benefit of and priority to the copending non-provisional patent application Ser. No. 13/601,465, entitled "SYSTEM AND METHOD FOR DISPLAYING A MULTIMEDIA CONTAINER," with filing date May 23, 2013, and hereby incorporated by reference in its entirety.

This application claims the benefit of and priority to the copending non-provisional patent application Ser. No. 13/601,468, entitled "SYSTEM AND METHOD FOR A HOME MULTIMEDIA CONTAINER," with filing date May 23, 2013, and hereby incorporated by reference in its entirety.

This claims the benefit of and priority to non-provisional patent application Ser. No. 13/631,563, entitled "SYSTEM AND METHOD FOR A GRAPHICAL USER INTERFACE INCLUDING RECOMMENDATIONS," with filing date Jun. 28, 2013, and hereby incorporated by reference in its entirety.

FIELD OF THE INVENTION

Embodiments of the present invention are generally related to graphical user interfaces that may be part of a mobile device operating system.

BACKGROUND

As computing technology has advanced, computers have become smaller and more portable thereby bringing about powerful handheld devices capable of performing functions of more traditional computing technology. These advancements have resulted in rapid growth and sales of mobile devices. The portable nature and corresponding smaller size of mobile devices means that conventional merchandising and advertising are not well suited for mobile devices.

A user browsing the Internet may be able to quickly identify content that looks and feels like advertisements and often ignores perceived advertising content accordingly. For example, banner ads may be tall and thin while other advertisements are short and wide. The smaller screen of a mobile device may result in a user being increasingly more critical of content that may be an advertisement and accordingly ignores content perceived to be an advertisement. In particular, content that regularly directs a user to pay content is likely to be avoided or ignored by a user. Thus, conventional advertisements are not well suited for a mobile device.

SUMMARY OF THE INVENTION

Accordingly, what is needed is a solution to allow content to be presented to a user in an area that receives the user's attention and is relevant to the user. Embodiments of the present invention provide contextual recommendations with a mixture of free and pay content. The recommendations may be browsed in a full screen mode to enable browsing of recommended items more quickly and efficiently. Users are thereby able to more easily and quickly discover new and interesting content. Embodiments of the present invention further provide content source indicators and data type indicators associated with an item image to provide a user with insight into a recommended item before selecting the recommended item. Embodiments of the present invention support changing the size of an image corresponding to a recommended item based on a priority thereby emphasizing a recommended item and bringing a user's attention to the particular recommended item. The features described above facilitate a user locating a relevant item for purchase.

In one embodiment, the present invention is directed to a method for rendering a graphical user interface. The method includes accessing, within a mobile device, a data store corresponding to a multimedia container. The multimedia container comprises a first object and a second object and the multimedia container is operable to comprise one or more applications, widgets, pieces of content, and other multimedia containers. The data store comprises metadata associated with the first object and the second object. The method further includes displaying a plurality of images each corresponding to a respective recommendation based at least on the metadata associated with the first object and receiving an input. The plurality of items is displayed within a first portion of a display device. The method further includes in response to the input, displaying the plurality of images within a second portion of the display device. The second portion of the display device is greater in size than the first portion of the display device. The second portion of the display device may comprise a substantially full screen portion of the display device. In one exemplary embodiment, a size of a respective image of the plurality of images is based on a priority of a respective recommendation corresponding to the respective image.

In one embodiment, each respective image of the plurality of images comprises a content source indicator, wherein the content source indicator is operable to indicate a content provider corresponding to the respective image. The indicator of content source may be selected from the group consisting of a website, a database website, a music service, a video service, an electronic book service, and an online store. In another embodiment, each of the plurality of images comprises a data type indicator. The data type indicator may be selected from the group consisting of an electronic book, a video, audio, an image, a website, an application, and a widget.

In one embodiment, the present invention is directed toward a computer-readable storage medium having stored thereon, computer executable instructions that, if executed by a computer system cause the computer system to perform a method for displaying a graphical user interface. The method includes accessing, within a mobile device, a data store corresponding to a multimedia container. The multimedia container comprises a first object and the first object is operable to be selected from the group consisting of an application, a widget, a piece of content, and another multimedia container. The data store comprises metadata associated with the first object. The method further includes displaying a first image corresponding to a first recommendation based at least on the metadata associated with the first object. The first image is displayed within a first area of a display device. The method further includes receiving a first input to expand the first area comprising the first image and in response to the first input, displaying the first image within a second area of the display device. The second area of the display device corresponds to a full screen mode and the first image is scaled according to a priority corresponding to the first recommendation.

The method may further includes receiving a second input to reduce the second area and in response to the second input, displaying the first image within the first area of the display device. The method may further include receiving a second input to scroll the second area of the display device and in response to the second input, displaying a second image corresponding to a second recommendation based at least on metadata associated with the first object. The method may further include receiving a second input to select a second multimedia container. The second multimedia container comprises a second object. In response to the second input, the method may include displaying a second image corresponding to a second recommendation based on the second object.

In one embodiment, the first image comprises a source indicator. The source indicator may be selected from the group consisting of a website, a database website, a music service, a video service, an electronic book service, and an online store. In another embodiment, the first image comprises a type indicator. The type indicator may be selected from the group consisting of an electronic book, a video, audio, an image, a website, an application, and a widget.

In another embodiment, the present invention is implemented as a system for displaying a graphical user interface. The system includes a data store access module operable to access a data store corresponding to a first multimedia container, wherein the multimedia container comprises a first object, wherein the first object is operable to be selected from the group consisting of an application, a widget, a piece of content, and another multimedia container. The system further includes a recommendation access module operable to access one or more recommended items corresponding to the first object. Each image of a plurality of images corresponds to a respective recommended item. The system further includes display module operable to display each respective image corresponding to a respective recommended item and a resize module operable to resize a portion of a display device displaying a first image of the plurality of images. The first image corresponds to a first recommended item. In one embodiment, the resize module is operable to invoke display of the first image in a full screen mode.

The system may further include an image sizing module operable to scale the first image based on a priority of a first recommendation corresponding to the first object. The system may further include an indicator determination module operable to determine at least one of a content source indicator and a data type indicator corresponding to a first recommended item. The system may further include an input module operable to receive input to invoke the resize module to resize the portion of the display device displaying the first image.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 900 of FIG. 9), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Systems and Methods for a Graphical User Interface Having a Dynamic Recommendations Area Embodiments of the present invention provide contextual recommendations with a mixture of free and pay content. The recommendations may be browsed in a full screen mode to enable browsing of recommended items more quickly and efficiently. Users are thereby able to more easily and quickly discover new and interesting content. Embodiments of the present invention further provide content source indicators and data type indicators associated with an item image to provide a user insight into a recommended item before selecting the recommended item. Embodiments of the present invention support changing the size of an image corresponding to a recommended item based on a priority thereby emphasizing a recommended item and bringing a user's attention to the particular recommended item. The features described above facilitate a user locating a relevant item for purchase.

FIGS. 1-7 illustrate example components used by various embodiments of the present invention. Although specific components are disclosed in FIGS. 1-7, it should be appreciated that such components are exemplary. That is, embodiments of the present invention are well suited to having various other components or variations of the components recited in FIGS. 1-7. It is appreciated that the components in FIGS. 1-7 may operate with other components than those presented, and that not all of the components of FIGS. 1-7 may be required to achieve the goals of embodiments of the present invention.

Figure 1:
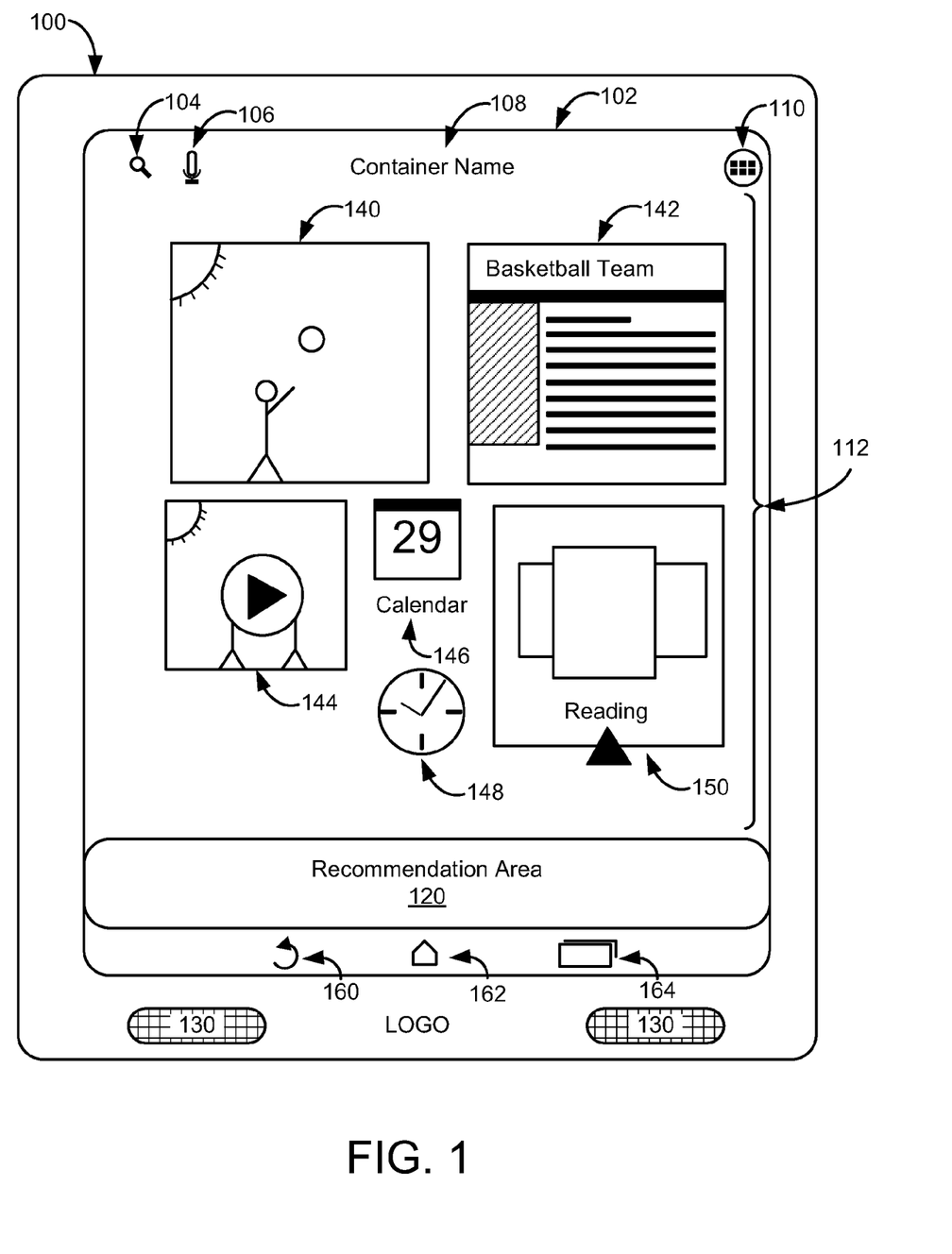
FIG. 1 shows an exemplary mobile device and an exemplary graphical user interface in accordance with one embodiment of the present invention.

FIG. 1 shows an exemplary mobile device and an exemplary multimedia container of an exemplary graphical user interface, in accordance with one embodiment of the present invention. FIG. 1 depicts an exemplary graphical user interface comprising an exemplary multimedia container displayed by a device (e.g., tablet computing device, mobile phone, smartphone, or the like).

In one embodiment, device 100 is a mobile computing device (e.g., tablet). Device 100 comprises speakers 130 and screen 102. In one embodiment, screen 102 is a touch sensitive screen (e.g., a capacitive touch screen) operable to receive input (e.g., from a user via one or more fingers) and display a graphical user interface. Speakers 130 are operable for output of audio during rendering of content (e.g., video, video games, animations, system functions, etc.).

Device 100 is operable to render a graphical user interface comprising a multimedia container. A multimedia container is a graphically navigable container that is operable to hold various objects of various media types (e.g., content), applications, widgets, and other multimedia containers. A multimedia container may include other multimedia containers therein which may further include respective content, applications, widgets, etc. In one exemplary embodiment, a multimedia container may include a song, an e-book, a video, a webpage, a contract, an email message, a text message, an application, etc. Multimedia containers display content in a pictorial manner thereby surfacing content for immediate consumption.

FIG. 1 depicts an exemplary graphical user interface rendered by device 100. The exemplary graphical user interface comprises search icon 104, voice recognition icon 106, container name 108, applications icon 110, object area 112, recommendation area 120, and control icons 160-164. It is noted the objects within the multimedia container described herein are exemplary and embodiments of the present invention can support more or less objects.

Object area 112 comprises pieces of content, application icons, widgets, and other multimedia containers within a multimedia container being displayed. In one exemplary embodiment, object area 112 includes image 140, website image 142, video image 144, application icon 146, widget 148, and multimedia container image 150. Pieces of content may be shown in pictorial form (e.g., without filenames). Objects in object area 112 can be resized by a user. Objects within object area 112 are selectable to launch a corresponding application or corresponding application for rendering content corresponding to the object in object area 112. Objects within object area 112 may be moved around (e.g., via dragging after selection via pressing and holding) or resized (e.g., via pressing and holding and manipulating a size control).

Image 140 is an image (e.g., scaled image, thumbnail, or the like) corresponding to an image that is stored on device 100. In one exemplary embodiment, image 140 is a scaled version of a child playing basketball (e.g., without a filename). Image 140 is selectable (e.g., via a touch or press) and is operable to launch an image viewing application to display an image corresponding to image 140 at full resolution. For example, a user can view image 140 at one resolution within the multimedia container and to see more detail a user can select image 140 to see the high resolution image that image 140 corresponds thereto.

Website image 142 corresponds to a rendering of a webpage (e.g., via a browser). In one exemplary embodiment, website image 142 is a scaled version of a rendering of the webpage according to a size specified corresponding to a multimedia container. In another embodiment, website image 142 is an image determined and selected from the content of the website corresponding to website image 142. Website image 142 is operable to be selected (e.g., via a touch or press) and is operable to launch a web browser to display the website corresponding to website image 142. Website image 142 and other objects within a multimedia container may be updated periodically (e.g., hourly, daily, and the like). In one embodiment, website image 142 and other objects are updated each time a user accesses the content corresponding to the object (e.g., the website corresponding to website image 142).

Video image 144 corresponds to a video (e.g., stored locally on device 100 or available over a communications network). In one embodiment, video image 144 is a scaled version (e.g., thumbnail) of a key frame of a video with an optional title. In one exemplary embodiment, video image 144 is a scaled version of a key frame of the video scaled according to a size specified corresponding to a multimedia container. Video image 144 is operable to be selected (e.g., via a touch or press) and is operable to launch a video application (e.g., for a video stored locally on device 100 or available for streaming) or launch a website with the video corresponding to video image 144.

Application icon 146 corresponds to an application and is selectable to launch the corresponding application. In one exemplary embodiment, application icon 146 corresponds to a calendar application and application icon 146 comprises an image of a calendar with the current date and text below with the name of the application.

Widget 148 is a widget and is operable to display live, auto-updating content. In one exemplary embodiment, widget 148 is a clock widget operable to display the current time. In one embodiment, widget 148 is operable to be selected (e.g., via touch or press) and upon selection launch a corresponding application (e.g., a clock application with alarm, timer, and stopwatch functionality).

Recommendation area 120 is operable to display recommendations of content (e.g., free or pay content) based on the objects of a multimedia container (e.g., based on the metadata associated with the objects of a multimedia container). In one embodiment, recommendation area 120 includes images representing content that is recommended based on the pieces of content (and/or applications and widgets) in the multimedia container.

Multimedia container image 150 is of a reading related multimedia media container which may include reading related objects (e.g., electronic book related application, widgets, and content). In one embodiment, display of multimedia container image 150 comprises images of objects within the multimedia container corresponding to multimedia image 150. In one exemplary embodiment, multimedia container image 150 includes an outerframe and triangle to indicate to a user that multimedia container image 150 corresponds to a multimedia container and selecting (e.g., via touch or press) launches display of the multimedia container. Multimedia container image 150 may be selected with a press and hold interaction and then dragged around to move multimedia container image 150.

Control icons 160-164 are operable for navigation of a plurality of multimedia containers and switching applications. Back control 160 is operable for navigation to a previous multimedia container. Home control 162 is operable for navigating to a home multimedia container. Recent applications button 164 is operable to invoke a function for changing or switching applications.

Applications icon 110 is operable for invoking display of a graphical user interface for browsing application icons and launching corresponding applications. In one embodiment, the graphical user interface for browsing applications is organized into multiple pages of application icons.

Figure 2:
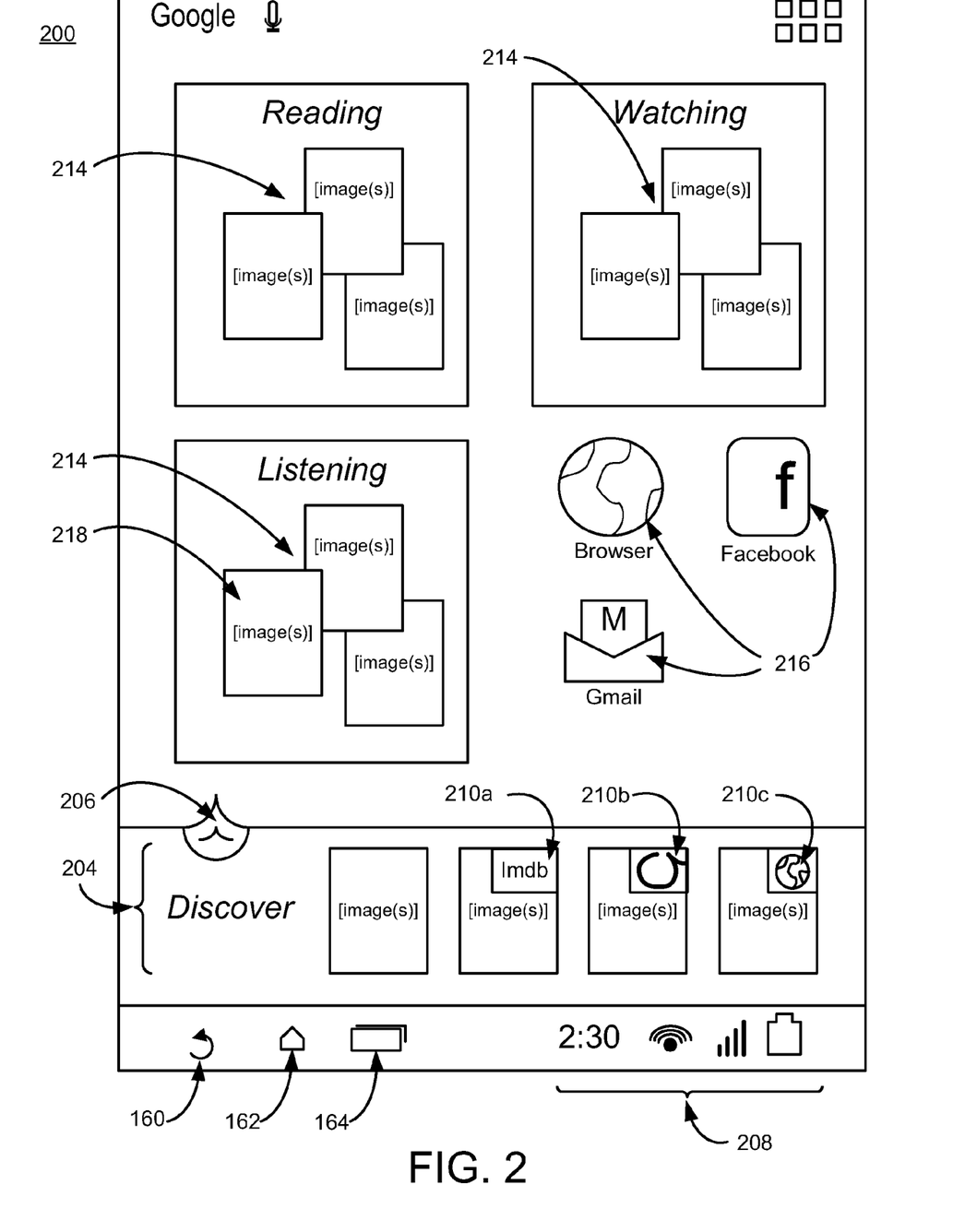
FIG. 2 shows an exemplary graphical user interface with an exemplary recommendation area in accordance with one embodiment of the present invention.

FIG. 2 shows an exemplary graphical user interface with an exemplary recommendation area in accordance with one embodiment of the present invention. Exemplary graphical user interface 200 includes images 214, icons 216, recommendation area 204, status area 208, and controls 160-164. In one embodiment, exemplary graphical user interface 200 includes elements similar to exemplary graphical user interface 100.

Images 214 correspond to a Reading multimedia container, a Watching multimedia container, and a Listening multimedia container. Images 214 may further include image 218 comprising one or more images corresponding to objects within a respective multimedia container. Icons 216 correspond to applications of the multimedia container being displayed in exemplary graphical user interface 200. Each of icons 216 is operable to launch the corresponding application.

Status area 208 includes information of the current status of the device. In one exemplary embodiment, status area 208 includes the battery status, cellular service strength, Wi-Fi strength, and the current time.

The recommendations in recommendation area 204 may be based on the pieces of content, applications, and widgets in the home multimedia container and the multimedia containers within the home multimedia container (e.g., Browsing, Reading, and Watching multimedia containers as shown in FIG. 2). Recommendation area 204 may thus include recommended pieces of content based on the objects within a multimedia container being displayed and the objects within the multimedia containers that are within the multimedia container being displayed. For example, when a user is in a home multimedia container which includes a reading multimedia container and a car multimedia container, recommendation area 204 may include recommended items related to the books in the reading multimedia container and cars multimedia container.

When a multimedia container is opened or accessed, recommendations area 204 may present recommendations based on the contents of the opened and displayed multimedia container. For example, if a user opens a car multimedia container, recommendations area 204 may include car related items including websites about cars and car videos. As another example, if a user has a multimedia container for his or her favorite holiday spot, when the multimedia container is opened, recommendations area 204 may display books about the area and magazine articles about new restaurants. Additional recommended items may be displayed in recommended area 204 via scrolling.

The recommendations may be determined (e.g., based on the contents of the multimedia container) as described in non-provisional patent application Ser. No. 13/631,563, entitled "SYSTEM AND METHOD FOR A GRAPHICAL USER INTERFACE INCLUDING RECOMMENDATIONS," with filing date Jun. 28, 2013, and hereby incorporated by reference in its entirety.

In one embodiment, the recommendations in recommendation area 204 have source indicators 210a-c. Source indicators, as described herein, allow a user to quickly look at or scan a recommended item and determine the source, content source, or content provider (e.g., without having to invoke displaying of and reading additional information). Embodiments of the present invention support source indicators for books, audio, video, games, photos, websites, etc. In one exemplary embodiment, source indicators 210a-c indicate to a user the source of the content. Source indicator 210a indicates that the source of the recommended piece of content is an internet movie website (e.g., Internet Movie Database (IMDb), available from Amazon Corporation of Seattle, Wash.). Source indicator 210b indicates that the source of the recommended piece of content (e.g., a song or album) is a streaming music service (e.g., Rdio, available from Rdio Corporation of San Francisco, Calif.). Source indicator 210c indicates that the source of the recommended piece of content is an internet website (e.g., depicted by a globe image). Source indicators 210a-c may thus indicate the content provider. Source indicators 210a-c may be helpful to the user to quickly determine information about the recommended item which may lead to a faster purchase decision or increased interest in the recommended item.

Recommendation area 204 further includes expansion image 206 (e.g., expansion slider) operable for expanding recommendation area 204 (e.g., via an upward or "pulling up"

motion). Expansion image 206 thus allows a user to expand recommendation area 204 to a larger portion of the screen (e.g., FIGS. 3-5 and 7) thereby allowing browsing of more recommended items.

Figure 3:
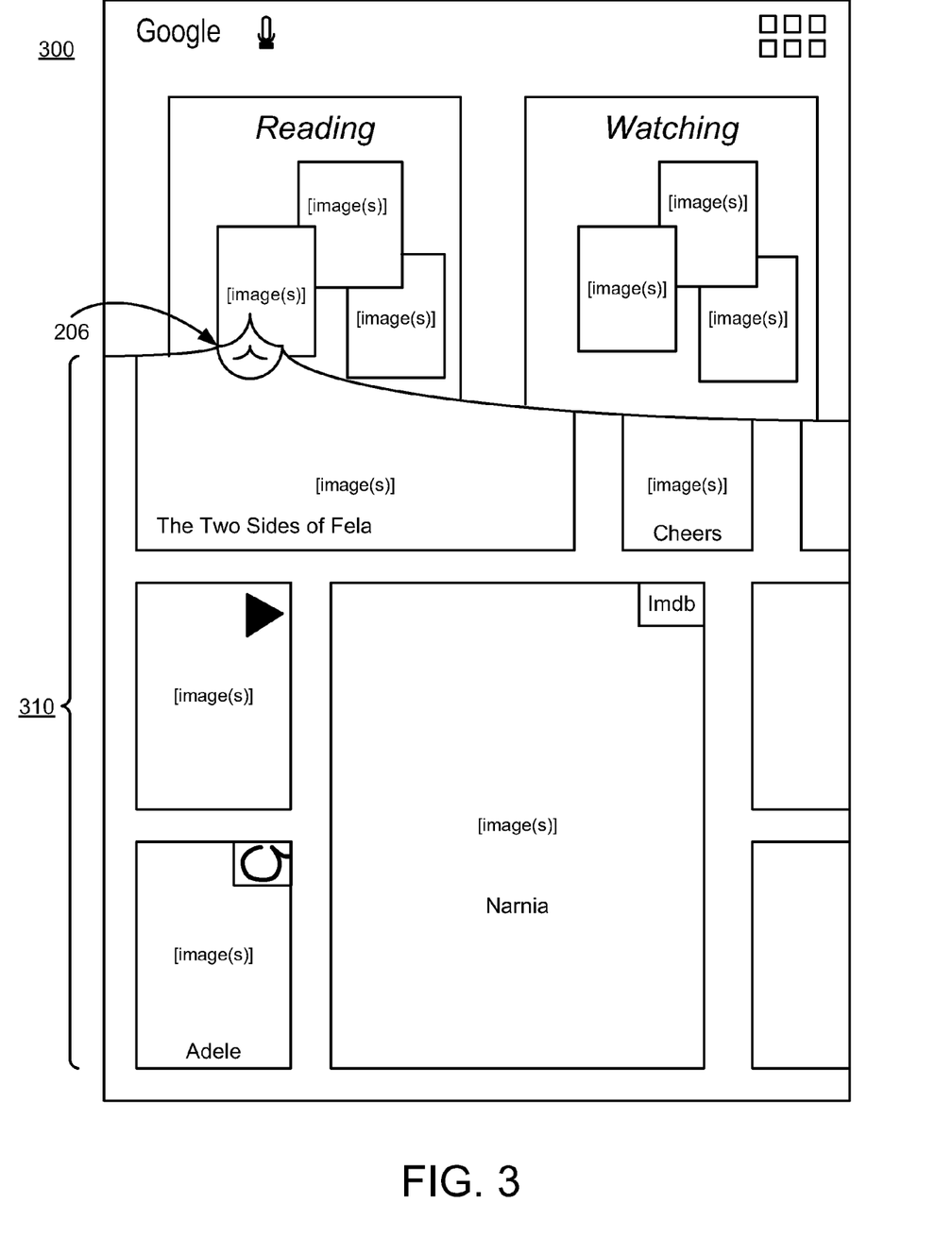
FIG. 3 shows an exemplary graphical user interface with an intermediate state of an expanded recommendation area in accordance with one embodiment of the present invention.

FIG. 3 shows an exemplary graphical user interface with an intermediate state of an expanded recommendation area in accordance with one embodiment of the present invention. FIG. 3 depicts an intermediate state of a recommendations area during expansion. In one embodiment, exemplary graphical user interface 300 includes elements similar to exemplary graphical user interface 200.

Exemplary graphical user interface 300 includes expanded recommendation area 310 (e.g., partially expanded) and expansion image 206. In one embodiment, exemplary graphical user interface 300 may be displayed when a user has pressed and is dragging or pulling expansion image 206 upward on a screen of the display device. In another embodiment, exemplary graphical user interface 300 may be displayed in response to a user pressing on expansion image 206 causing recommendation area 304 to expand automatically to the size of expanded recommendations 310 and beyond. In one exemplary embodiment, the expansion of the recommendations area may be shown using a curtain effect that shows the raising of a curtain to reveal a larger recommendations area.

Figure 4:
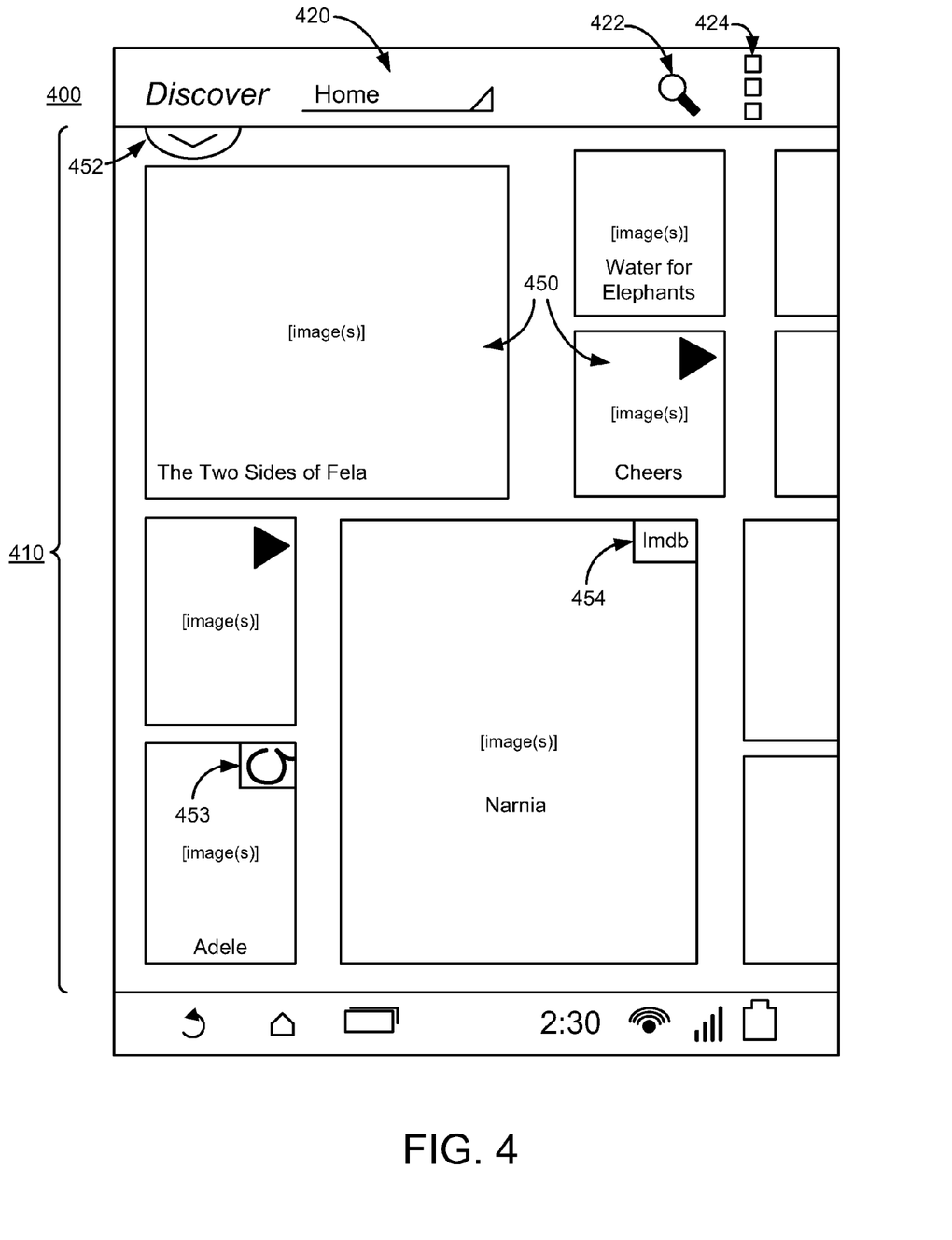
FIG. 4 shows an exemplary graphical user interface with an expanded recommendation area in accordance with one embodiment of the present invention.

FIG. 4 shows an exemplary graphical user interface with an expanded recommendation area in accordance with one embodiment of the present invention. FIG. 4 depicts an expanded recommendations area, e.g., expanded to a full screen mode. In one embodiment, exemplary graphical user interface 400 includes elements similar to exemplary graphical user interface 300. Exemplary graphical user interface 400 allows a user to browse additional recommended items at a single time beyond the recommendations of recommendation area 204. Exemplary graphical user interface 400 further allows a user to scroll through, select, and purchase recommended items via a full screen mode. Exemplary graphical user interface 400 thereby allows a user to browse more recommendations more easily as compared to recommendation area 204.

Exemplary graphical user interface 400 includes recommendation area 410, multimedia container indicator 420, search icon 422, and menu icon 424. Multimedia container indicator 420 includes the name of the current multimedia container, e.g., Home multimedia container, that is being used as the basis for the recommendations within expanded recommendation area 410. In one embodiment, multimedia container indicator 420 is operable for selection by a user to select another multimedia container to be used as a basis for recommendations. A user may thus select multimedia container indicator 420 to change the recommendations in recommendation area 410 to be based on the contents of a different multimedia container. Search icon 422 is operable for invoking a search function to search the recommendations of recommendation area 410 (e.g., including recommendations not currently displayed). Menu icon 424 is operable for invoking a menu settings area to configure the recommendations area.

Expanded recommendation area 410 includes a plurality of recommended items represented by images and collapse or reduce size button 452. Collapse or reduce size button 452 is operable for a user to use (e.g., via pulling downward) for reducing the size of the recommendation area (e.g., back to the previous size as shown in FIG. 2). Exemplary recommended items 450 include a music album called "the two sides of fela" and a television series called "Cheers." It is noted that the recommendations shown herein are for illustrative purposes only, and the actual recommendations may vary accordingly. Recommended items in expanded recommendation area 410 may have source or content provider indicators 453 and 454. For example, source indicator 453 of a recommended music item corresponds to a streaming radio service (e.g., Rdio from Rdio Corporation in San Francisco, Calif.). The source or content provider indicator may be used for content which is being accessed from sources that have a business relationship with the provider and/or recommendations company that developed graphical user interface 400. As another example, source indicator 454 of a recommended movie item corresponds to a website (e.g., Internet Movie Database (IMDb), available from Amazon Corporation of Seattle, Wash.) of the website that the image of the movie poster will bring the user to upon selection.

In one embodiment, the images corresponding to the recommended items displayed in graphical user interface 400 may be sized based on the priority of the recommended item. For example, if a recommended item (e.g., piece of content) is highly recommended based on the contents of the Home multimedia container, the image corresponding the recommend item (e.g., "the two sides of fela" music album or "Narnia" movie) may enlarge relative to other images of recommended items (e.g., "Cheers" video or "Adele" music album). Exemplary graphical user interface 400 may thus allow an image corresponding to a recommended item to be two dimensionally sized based on priority of the recommended item in a full screen mode.

Figure 5:
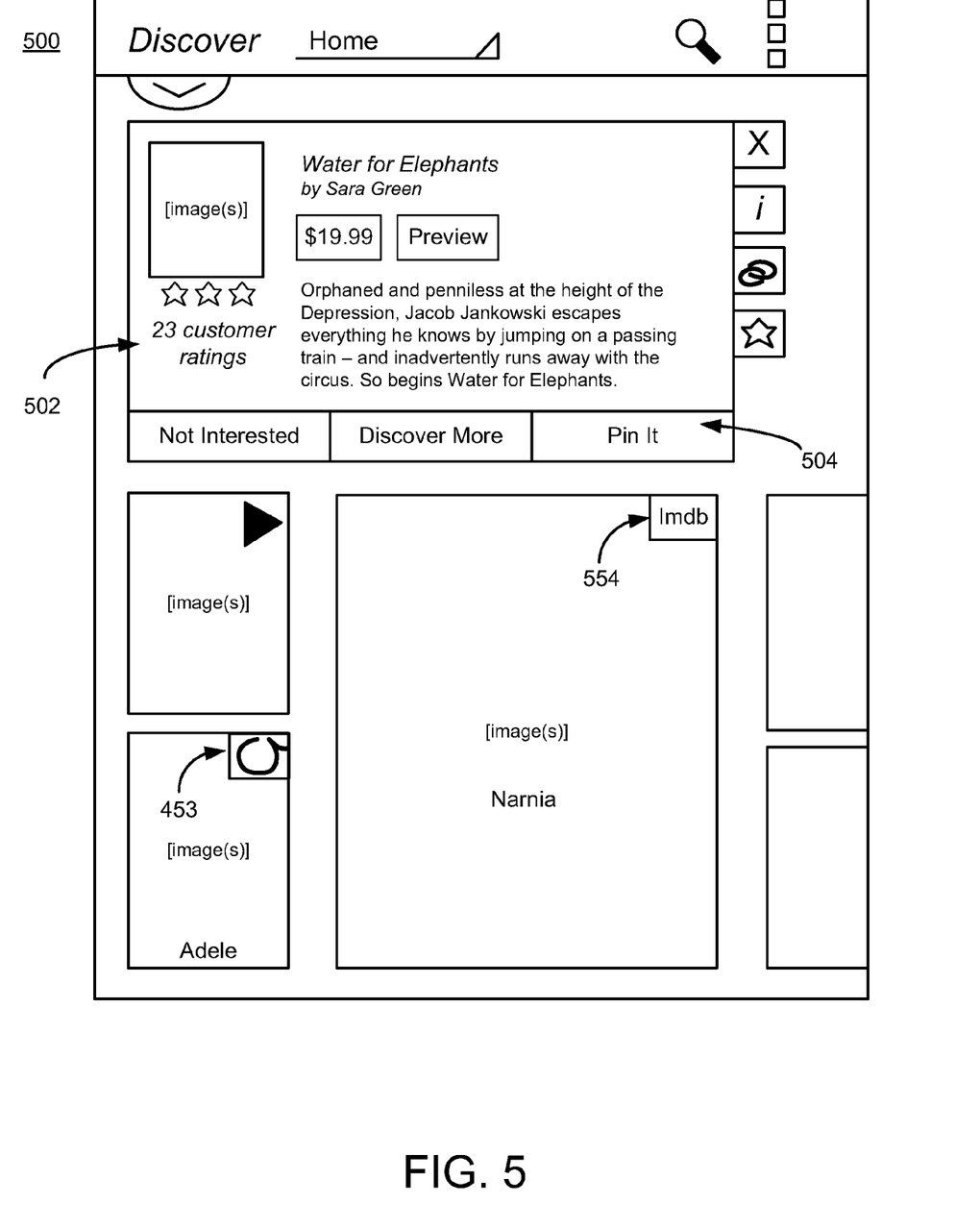
FIG. 5 shows an exemplary graphical user interface upon selection of a recommendation from a recommendation area in accordance with one embodiment of the present invention.

FIG. 5 shows an exemplary graphical user interface upon selection of a recommendation from a recommendation area in accordance with one embodiment of the present invention. FIG. 5 depicts a context window 502 that may be presented upon a user selecting a recommendation. Context window 502 may allow a user to preview, purchase, and/or learn more about the recommended content. Context window 502 may include option 504 which allows a user to add (or "pin") the recommended content to a multimedia container, as described in, non-provisional patent application Ser. No. 13/601,426, entitled "SYSTEM AND METHOD FOR MANAGING OBJECTS IN A MULTIMEDIA CONTAINER," with filing date May 23, 2013, and hereby incorporated by reference in its entirety.

Context window 502 may be presented upon selection of a recommended item as described, for example, with respect to FIG. 3A-3B and 4A-4B in non-provisional patent application Ser. No. 13/631,563, entitled "SYSTEM AND METHOD FOR A GRAPHICAL USER INTERFACE INCLUDING RECOMMENDATIONS," with filing date Jun. 28, 2013, and hereby incorporated by reference in its entirety.

Figure 6:
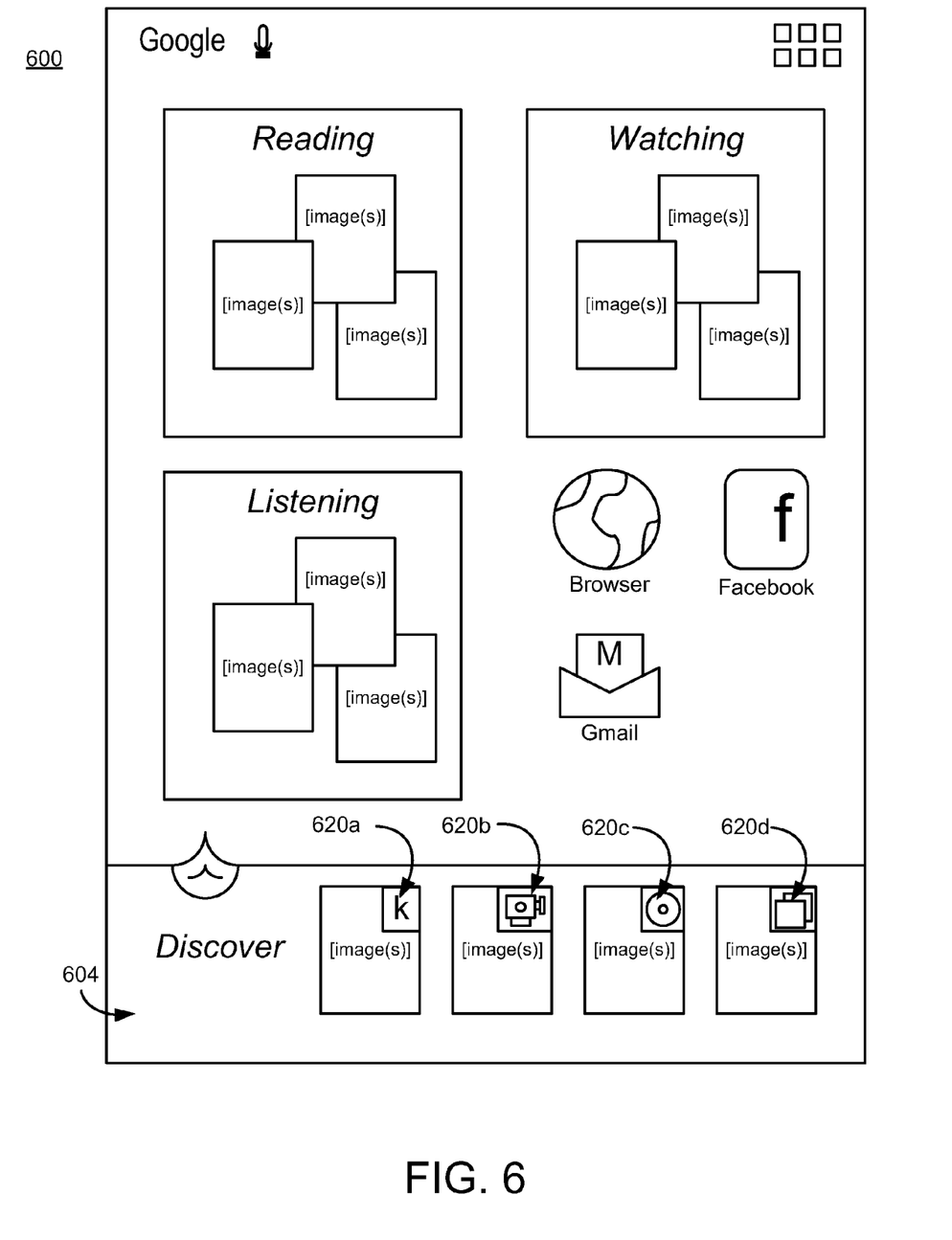
FIG. 6 shows an exemplary graphical user interface of a recommendation area with data type indicators in accordance with one embodiment of the present invention.

FIG. 6 shows an exemplary graphical user interface of a recommendation area with data type indicators in accordance with one embodiment of the present invention. FIG. 6 depicts an exemplary graphical user interface 600 with a recommendation area 604 having type indicators. In one embodiment, exemplary graphical user interface 600 includes elements similar to exemplary graphical user interface 200.

Recommendation area 604 includes recommendations having data type indicators 620*a-d*. Data type indicators, as described herein, allow a user to quickly look at or scan a recommended item and determine the data type (e.g., without having to invoke displaying of and reading additional information). Embodiments of the present invention support data type indicators including books, audio, video, games, photos, websites, etc. Data type indicator 620*a* (e.g., of an electronic book company logo) indicates that the corresponding recommended piece of content is an electronic book (e.g., from Kobo Inc. of Toronto, Canada). Data type indicator 620*b* (e.g., of a video camera) indicates the corresponding recommended piece of content is a movie or video. Data type indicator 620c (e.g., of a compact disc) indicates the corresponding recommended piece of content is audio (e.g., song or album). Data type indicator 620d (e.g., of a graphics file) indicates the corresponding recommended piece of content is an image (e.g., a photograph). In one exemplary embodiment, recommendations in recommendation area 604 may alternatively display source indicators (e.g., source indicators 210a-d) or data type indicators (e.g., data type indicators 620a-d) in an animated fashion.

Figure 7:
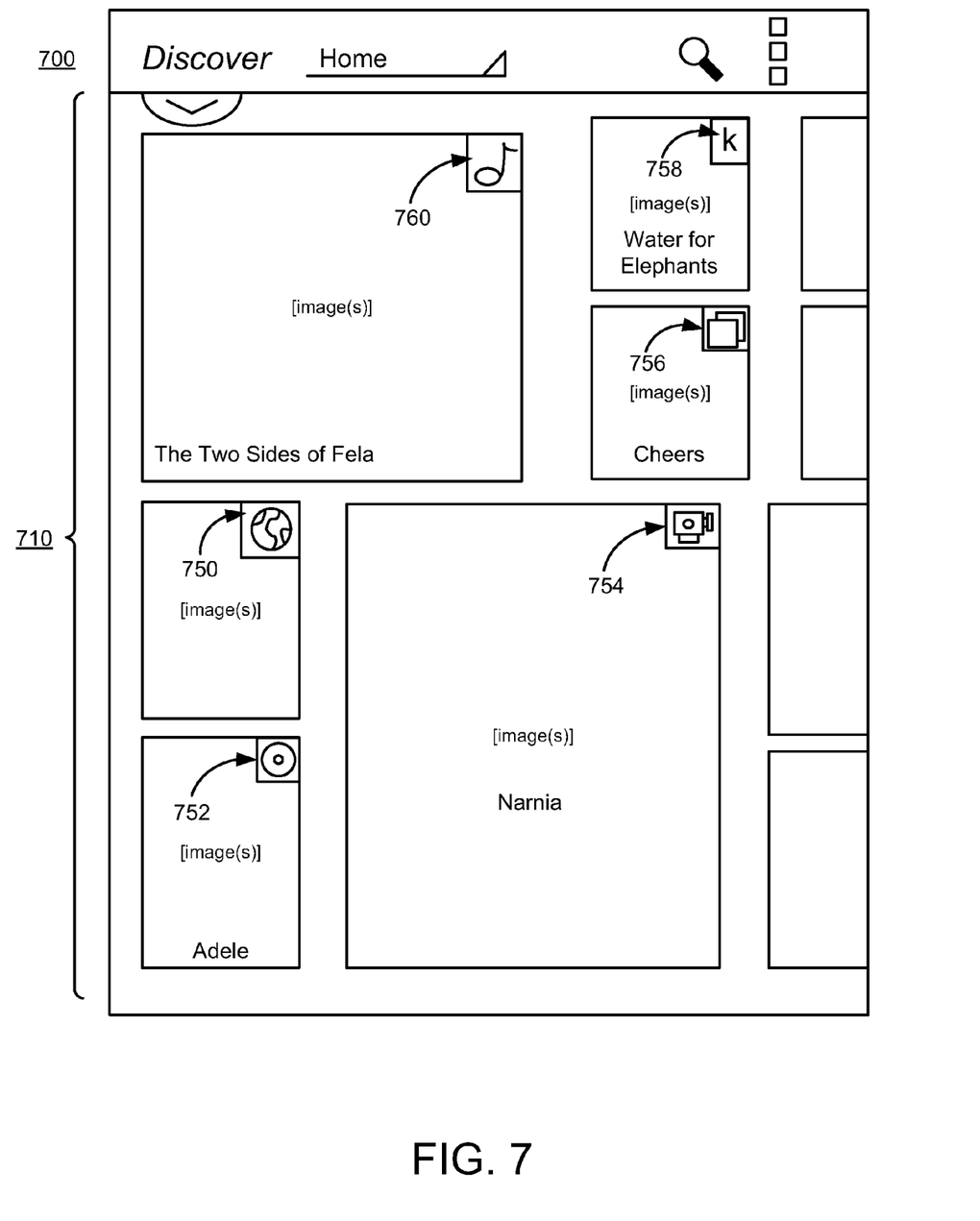
FIG. 7 shows an exemplary graphical user interface of an expanded recommendation area with source indicators in accordance with one embodiment of the present invention.

FIG. 7 shows an exemplary graphical user interface of an expanded recommendation area with source indicators in accordance with one embodiment of the present invention. FIG. 7 depicts an expanded recommendations area 710 with recommendations having data type indicators. In one embodiment, exemplary graphical user interface 700 includes elements similar to exemplary graphical user interface 400.

Recommendation area 710 includes recommendations having data type indicators 750-760. Data type indicator 750 (e.g., of a globe) indicates the corresponding recommended piece of content is a website. Data type indicator 752 (e.g., of a compact disc) indicates the corresponding recommended piece of content is audio (e.g., song or album). Data type indicator 754 (e.g., of a video camera) indicates the corresponding recommended piece of content is a movie or video. Data type indicator 756 (e.g., of a graphics file) indicates the corresponding recommended piece of content is an image (e.g., a photograph). Data type indicator 758 (e.g., of an electronic book company logo) indicates the corresponding recommended piece of content is an electronic book (e.g., from Kobo Inc. of Toronto, Canada). Data type indicator 760 (e.g., of a musical note) indicates the corresponding recommended piece of content is audio (e.g., song or album).

Figure 8:
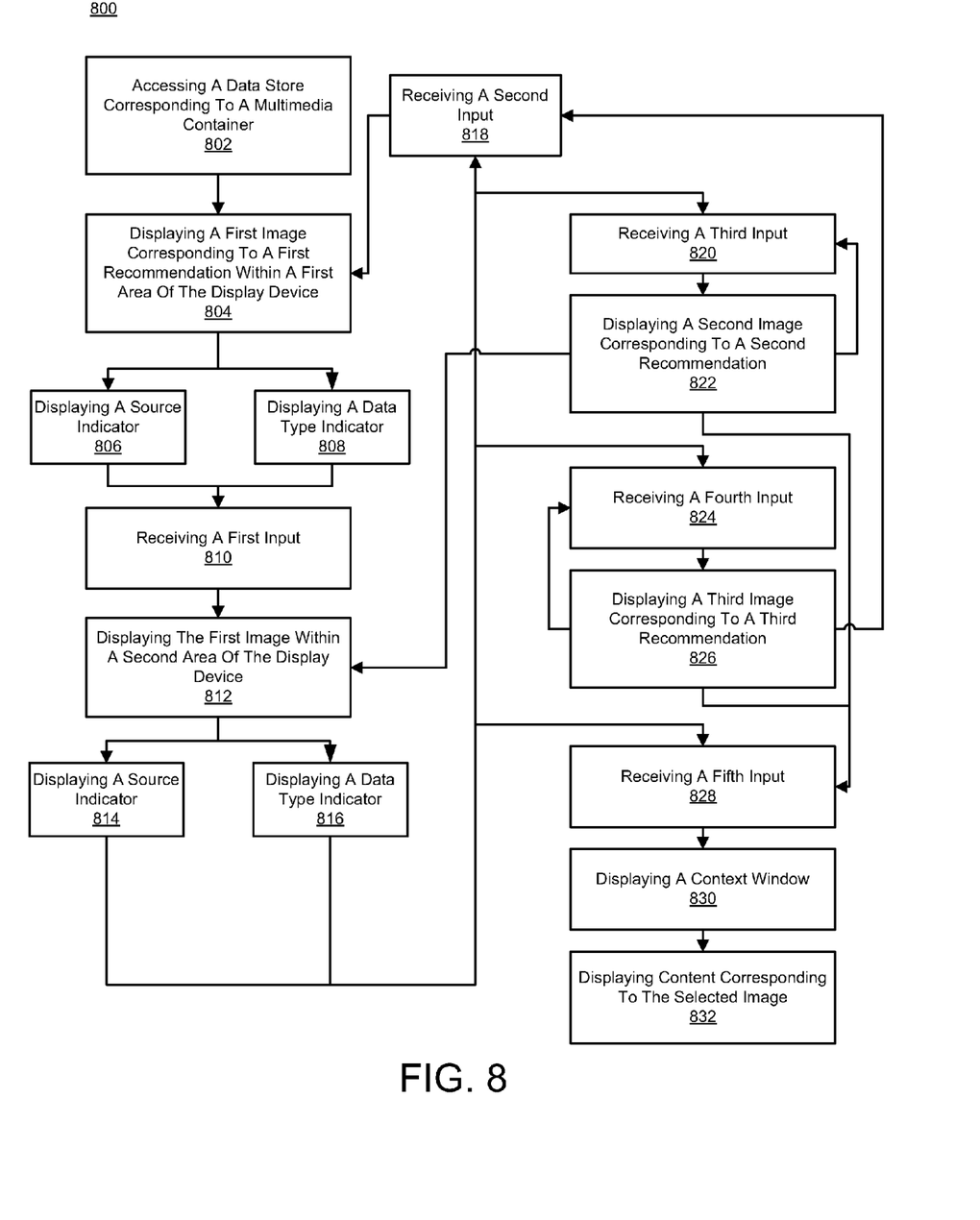
FIG. 8 shows a flowchart of an exemplary computer controlled process for generating a graphical user interface in accordance with one embodiment of the present invention.

With reference to FIG. 8, flowchart 800 illustrates example functions used by various embodiments of the present invention for displaying graphical user interfaces. Although specific function blocks ("blocks") are disclosed in flowchart 800, such steps are examples. That is, embodiments are well suited to performing various other blocks or variations of the blocks recited in flowchart 800. It is appreciated that the blocks in flowchart 800 may be performed in an order different than presented, and that not all of the blocks in flowchart 800 may be performed.

FIG. 8 shows a flowchart of an exemplary computer controlled process for generating a graphical user interface in accordance with one embodiment of the present invention. FIG. 8 depicts a process 800 for displaying recommended items concurrently with the contents of a multimedia container (e.g., FIG. 2) and displaying the recommended items in an expanded view or area (e.g., FIG. 4).

At block 802, a data store corresponding to a multimedia container is accessed (e.g., within a mobile device). In one embodiment, the multimedia container comprises a first object and the data store comprises metadata associated with the first object. The first object is operable to be selected from the group consisting of an application, a widget, a piece of content, and another multimedia container. The multimedia container is operable to comprise one or more applications, widgets, pieces of content, and other multimedia containers.

At block 804, a first image corresponding to a first recommendation based at least on the metadata associated with the first object is displayed within a first area of a display device. In one embodiment, a plurality of images each corresponding to a respective recommendation based at least on the metadata associated with the first object is displayed. The plurality of items is displayed within a first portion of a display device.

At block 806, the first image optionally includes a source indicator. In one embodiment, the source indicator may be selected from the group consisting of a website, a database website, a music service, a video service, an electronic book service, and an online store.

At block 808, the first image optionally includes a type indicator or data type indicator. In one embodiment, the type indicator may be selected from the group consisting of an electronic book, a video, audio, an image, a website, an application, and a widget.

At block 810, a first input to expand the first area comprising the first image is received (e.g., via expansion image 206), as described herein.

At block 812, the first image is displayed within a second area of the display device. In one embodiment, the second area of the display device corresponds to a full screen mode or a substantially full screen portion of the display device. The first image may be scaled according to a priority corresponding to the first recommendation. In one embodiment, the plurality of images is displayed within a second portion of the display device. The second portion of the display device is greater in size than the first portion of the display device.

In one exemplary embodiment, the size of an image corresponding to a recommended item may be sized (e.g., scaled or enlarged) based on the priority of a recommendation corresponding to the recommended item. In one embodiment, a size of a respective image of the plurality of images is based on a priority of a respective recommendation corresponding to the respective image.

At block 814, the first image optionally includes a source indicator, as described herein.

At block 816, the first image optionally includes a type indicator, as described herein.

At block 818, a second input to reduce the second area is received (e.g., via collapse button 452). Block 804 may then be performed and the first image is displayed within the first area of the display device.

At block 820, a third input to scroll the second area of the display device is received, as described herein.

At block 822, a second image corresponding to a second recommendation based at least on metadata associated with the first object is displayed. For example, a newly recommend item may be displayed during scrolling.

At block 824, a fourth input to select a second multimedia container is received. The second multimedia container comprises a second object.

At block 826, a second image corresponding to a second recommendation based on the second object is displayed. For example, the second image may correspond to a recommendation based on a newly selected multimedia container.

At block 828, a fifth input is received selecting an image corresponding to a recommended item. For example, the fifth input may be received upon a user selecting an image corresponding to a recommended item.

At block 830, a context window is displayed in response to selection of an image corresponding to a recommended item. In one embodiment, the context window is operable for previewing, viewing, and/or purchasing a piece of content corresponding to the image (e.g., FIG. 5).

At block 832, content corresponding to the selected image (e.g., selected by a user) is displayed. In one embodiment, the content is a piece or pieces of content recommended based on the content of a multimedia container, as described herein.

Figure 9:
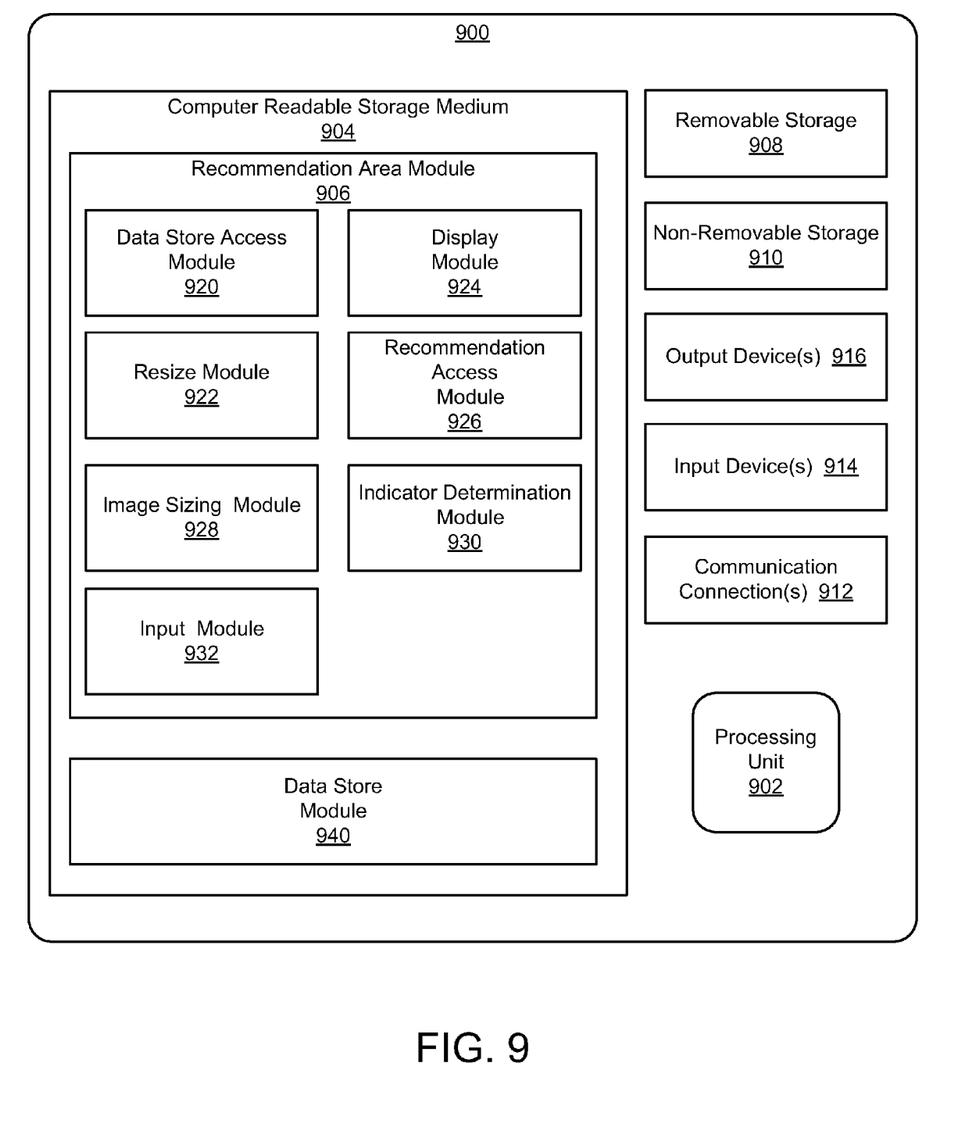
FIG. 9 shows a block diagram of an exemplary computing system and corresponding modules, in accordance with one embodiment of the present invention.

FIG. 9 illustrates exemplary components used by various embodiments of the present invention. Although specific components are disclosed in computing system environment 900, it should be appreciated that such components are exemplary. That is, embodiments of the present invention are well suited to having various other components or variations of the components recited in computing system environment 900. It is appreciated that the components in computing system environment 900 may operate with other components than those presented, and that not all of the components of system 900 may be required to achieve the goals of computing system environment 900.

FIG. 9 shows a block diagram of exemplary computer system and corresponding modules, in accordance with one embodiment of the present invention. With reference to FIG. 9, an exemplary system module for implementing embodiments includes a general purpose computing system environment, such as computing system environment 900. Computing system environment 900 may include, but is not limited to, servers, desktop computers, laptops, tablet PCs, tablet computing devices, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed facilitate efficient execution of memory operations or requests for groups of threads. Computing system environment 900 may further include a power source (e.g., battery) (not shown) operable to allow computing system environment 900 to be movable and mobile while operating.

Additionally, computing system environment 900 may also have additional features/functionality. For example, computing system environment 900 may also include additional storage (removable and/or non-removable) including, but not limited to, magnetic or optical disks or tape. Such additional storage is illustrated in FIG. 10 by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

Computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 912 may allow computing system environment 900 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), Near Field Communication (NFC), Code Division Multiple Access (CDMA), Global System for Mobile Communications (GSM), Long-term Evolution (LTE), Worldwide Interoperability for Microwave Access (WiMax), wide area networks (WAN) such as the internet, serial, and universal serial bus (USB). It is appreciated the various network types that communication connection(s) 912 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 900 may also have input device(s) 914 such as a touch screen (e.g., capacitive touch screen), keyboard, mouse, pen, voice input device, touch input device, remote control, camera, etc. Output device(s) 916 such as a display (e.g., touch screen), speakers, etc. may also be included. All these devices are well known in the art and are not discussed at length.

In one embodiment, computer readable storage medium 904 includes recommendation area module 906 and data store module 940. Data store module 940 is operable to store data (e.g., data structures) corresponding to objects (e.g., pieces of content, applications, widgets, and other multimedia containers) within one or more multimedia containers and metadata associated with the objects. Data store module 940 may further store recommended item information or data based on the multimedia container objects and the associated metadata. Recommendation area module 906 includes data store access module 920, display module 922, resize module 924, recommendation access module 926, image sizing module 928, indicator determination module 930, and input module 932.

In one embodiment, computer readable storage medium 904 may further include modules, e.g., of FIG. 8, as described in non-provisional patent application Ser. No. 13/631,563, entitled "SYSTEM AND METHOD FOR A GRAPHICAL USER INTERFACE INCLUDING RECOMMENDATIONS," with filing date Jun. 28, 2013, and hereby incorporated by reference in its entirety.

Data store access module 920 is operable to access a portion of data store module 940 corresponding to a first multimedia container (e.g., a multimedia container being displayed) and corresponding recommended items. The multimedia container comprises a first object (e.g., a piece of content, application, widgets, or other multimedia container). The first object is operable to be selected from the group consisting of an application, a widget, a piece of content, and another multimedia container.

Display module 922 is operable to display each respective image corresponding to a respective recommended item, as described herein. Display module 922 is further operable to display each respective image with a source indicator or data type indicator, as described herein.

Resize module 924 is operable to resize a portion of a display device displaying a first image of the plurality of images wherein the first image corresponds to a first recommended item. In one embodiment, resize module 924 is operable to invoke display of the first image in a full screen mode.

Recommendation access module 926 is operable to access one or more recommended items (e.g., from data source 940 or another data source) corresponding to the first object where each image of a plurality of images corresponds to a respective recommended item, as described herein.

Image sizing module 928 is operable to scale the first image based on a priority of a first recommendation corresponding to the first object, as described herein.

Indicator determination module 930 is operable to determine at least one of a content source indicator and a data type indicator corresponding to a first recommended item, as described herein.

Input module 932 is operable to receive input to invoke resize module 924 to resize the portion of the display device displaying the first image (e.g. upon a user dragging up expansion image 206). Input module 932 is further operable to receive input to invoke resize module 924 to reduce the portion of the display device displaying the first image (e.g. upon a user dragging down collapsed button 452). Input module 932 is operable to receive a selection of a respective image corresponding to a respective recommended item. Input module 932 may invoke exemplary graphical user interface 500 upon selection of a recommended piece of content.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rendering a graphical user interface, said method comprising:
    accessing, within a mobile device, a data store corresponding to a multimedia container, wherein said multimedia container comprises objects corresponding to one or more applications, widgets, pieces of content, and other multimedia containers, said objects including a first object and a second object, wherein said data store comprises metadata associated with said first object and said second object;
    displaying a plurality of first images on a display device of said mobile device, each of said first images corresponding to a respective object of said multimedia container;
    displaying a plurality of second images, each of said second images corresponding to a respective recommendation based at least on said metadata associated with said first object, wherein said plurality of second images is displayed within a first portion of said display device while at least a subset of said plurality of first images is also displayed on said display device;
    receiving an input; and
    in response to said input, displaying said plurality of second images within a second portion of said display device, wherein said second portion is generated by expanding the size of said first portion.

2. The method as described in claim 1, wherein said second portion of said display device comprises a substantially full screen portion of said display device.

3. The method as described in claim 1, wherein each respective image of said plurality of second images comprises a content source indicator, wherein said content source indicator identifies a content provider that is a source of content corresponding to said respective image.

4. The method as described in claim 3, wherein said content provider is selected from the group consisting of a website, a database website, a music service, a video service, an electronic book service, and an online store.

5. The method as described in claim 1, wherein each image of said plurality of second images comprises a data type indicator.

6. The method as described in claim 5, wherein said data type indicator is selected from the group consisting of an electronic book, a video, audio, an image, a website, an application, and a widget.

7. The method as described in claim 1, wherein a size of a respective image of said plurality of second images is based on a priority of said respective recommendation.

8. A non-transitory computer-readable storage medium having stored thereon, computer executable instructions that, if executed by a computer system, cause the computer system to perform a method for rendering a graphical user interface, said method comprising:
    accessing, within a mobile device comprising said computer system, a data store corresponding to a multimedia container, wherein said multimedia container comprises objects corresponding to one or more applications, widgets, pieces of content, and other multimedia containers, said objects including a first object, wherein said data store comprises metadata associated with said first object;
    displaying a plurality of first images on a display device of said mobile device, each of said first images corresponding to a respective object of said multimedia container;
    displaying a second image corresponding to a first recommendation based at least on said metadata associated with said first object, wherein said second image is displayed within a first area of said display device while at least a subset of said plurality of first images is also displayed on said display device;
    receiving a first input to expand said first area comprising said second image; and
    in response to said first input, displaying said second image within a second area of said display device, wherein said second area is larger than said first area, wherein said second image is scaled according to a priority corresponding to said first recommendation.

9. The non-transitory computer-readable storage medium as described in claim 8, wherein said method further comprises:
    receiving a second input to reduce said second area; and
    in response to said second input, displaying said second image within said first area of said display device.

10. The non-transitory computer-readable storage medium as described in claim 8, wherein said method further comprises:
    receiving a second input to scroll said second area of said display device;
    in response to said second input, displaying a third image in said second area, said third image corresponding to a second recommendation based at least on metadata associated with said first object.

11. The non-transitory computer-readable storage medium as described in claim 8, wherein said method further comprises:
    receiving a second input to select a second multimedia container, wherein said second multimedia container comprises a second object; and
    displaying a third image corresponding to a second recommendation based on said second object.

12. The non-transitory computer-readable storage medium as described in claim 8, wherein said second image comprises a source indicator that identifies a content provider that is a source of content corresponding to said second image.

13. The non-transitory computer-readable storage medium as described in claim 12, wherein said source indicator is selected from the group consisting of a website, a database website, a music service, a video service, an electronic book service, and an online store.

14. The non-transitory computer-readable storage medium as described in claim 8, wherein said second image comprises a type indicator.

15. The non-transitory computer-readable storage medium as described in claim 14, wherein said type indicator is selected from the group consisting of an electronic book, a video, audio, an image, a website, an application, and a widget.

16. A system for rendering a graphical user interface, said system comprising:
   a processing unit;
   a display device coupled to said processing unit; and
   non-transitory computer-readable storage medium coupled to said processing unit and comprising computer-executable modules, said modules comprising:
   a data store access module operable to access a data store corresponding to a first multimedia container, wherein said multimedia container comprises objects corresponding to one or more applications, widgets, pieces of content, and other multimedia containers, said objects including a first object;
   a recommendation access module operable to access one or more recommended items corresponding to said first object;
   a display module operable to display a plurality of first images on said display device, each of said first images corresponding to a respective object of said multimedia container, said display module further operable to display a second image in a first portion of said display device while at least a subset of said plurality of first images is also displayed on said display device, said second image corresponding to a first recommended item of said one or more recommended items;
   an input module operable to receive input to resize said first portion of said display device displaying said second image; and
   wherein said display module, in response to said input, is operable to display said second image within a second portion of said display device, wherein said second portion is generated by expanding the size of said first portion.

17. The system as described in claim 16, wherein said resize module is operable to invoke display of said second image in a full screen mode.

18. The system as described in claim 16, wherein said modules further comprise:
   an image sizing module operable to scale said second image based on a priority of said first recommended item.

19. The system as described in claim 16, wherein said modules further comprise:
   an indicator determination module operable to determine at least one of a content source indicator and a data type indicator corresponding to said first recommended item,
   wherein said content source indicator identifies a content provider that is a source of content corresponding to said first recommended item.

20. The system as described in claim 19, wherein said modules further comprise:
   a resize module operable to resize said first portion of said display device displaying said second image.

* * * * *